United States Patent [19]

Grabhoefer et al.

[11] 4,362,825

[45] Dec. 7, 1982

[54] PROCESS FOR THE PREPARATION OF FLEXIBLE POLYURETHANE FOAMS WITH IMPROVED RESISTANCE TO HYDROLYSIS AND GOOD DIE CUTABILITY

[75] Inventors: Herbert Grabhoefer, Ludwigshafen; Peter Weyland, Frankenthal, both of Fed. Rep. of Germany

[73] Assignee: BASF Aktiengesellschaft, Ludwigshafen, Fed. Rep. of Germany

[21] Appl. No.: 334,157

[22] Filed: Dec. 24, 1981

[30] Foreign Application Priority Data

Jan. 10, 1981 [DE] Fed. Rep. of Germany ....... 3100523

[51] Int. Cl.$^3$ ............................................. C08G 18/14
[52] U.S. Cl. ..................................... 521/172; 521/173
[58] Field of Search ................................. 521/172, 173

[56] References Cited

U.S. PATENT DOCUMENTS

3,055,867  9/1962  Le Bros et al. ..................... 521/172
4,237,240  12/1980  Jarre et al. .......................... 521/159

FOREIGN PATENT DOCUMENTS

2815540  10/1979  Fed. Rep. of Germany .

*Primary Examiner*—Maurice J. Welsh
*Attorney, Agent, or Firm*—Norbert M. Lisicki

[57] ABSTRACT

The invention concerns a process for the preparation of flexible polyurethane foams by reacting organic polyisocyanates, liquid polyester polyols having hydroxyl numbers of 40 to 80 and molecular weights of 1500 to 5000, which are produced by the polycondensation of organic dicarboxylic acids with either polyol mixture A, based on the overall polyol weight consisting of:

5 to 50 percent by weight of 1,4-butanediol,
  20 to 60 percent by weight of 1,5-pentanediol,
  8 to 35 percent by weight of 1,6-hexanediol,
  2 to 15 percent by weight of at least one triol, and
  0 to 65 percent by weight of diethylene glycol, or polyol mixture B, based on the overall polyol weight consisting of:

10 to 50 percent by weight of 1,4-butanediol,
  15 to 45 percent by weight of 1,6-hexanediol,
  15 to 65 percent by weight of diethylene glycol, and
  2 to 15 percent by weight of at least one triol, in the presence of catalysts and blowing agents as well as optionally chain extenders, auxiliaries and additives.

4 Claims, No Drawings

PROCESS FOR THE PREPARATION OF FLEXIBLE POLYURETHANE FOAMS WITH IMPROVED RESISTANCE TO HYDROLYSIS AND GOOD DIE CUTABILITY

BACKGROUND OF THE INVENTION

1. Field of the Invention

The invention concerns a process for the manufacture of flexible polyurethane foams with improved resistance to hydrolysis and good die cutability wherein liquid polyester polyols with hydroxyl numbers of 40 to 80 and molecular weights of 1500 to 5000 are used as the polyhydroxyl compounds. The polyhydroxyl compounds are prepared by the polycondensation of organic dicarboxylic acids with either polyol mixture A which contains 1,4-butanediol, 1,5-pentanediol, 1,6-hexanediol, at least one triol and optionally diethylene glycol or polyol mixture B which contains 1,4-butanediol, 1,6-hexanediol, diethylene glycol and at least one triol.

2. Prior Art

The preparation of flexible polyurethane foams is basically well known to those skilled in the art and is described in detail in the appropriate literature, for example, the Plastics Handbook, Volume VII, "Polyurethane" by R. Vieweg and A. Hoechtlen, Carl Hanser Publishers, Munich, 1966.

In addition to catalysts, blowing agents, as well as auxiliaries and additives, toluene diisocyanates are commonly used as the polyisocyanates in the preparation of polyurethane flexible foams. Mixtures of toluene diisocyanates, diphenylmethane-diisocyanates and polyphenyl-polymethylene-polyisocyanates are used in order to reduce the toxicity.

Preferably used as the polyhydroxyl compounds are polyether polyols, particularly those based on ethylene and/or propylene oxide. Drawbacks of the polyurethane flexible foams produced from these materials are that the physical properties do not meet the requirements of all areas of application and the foams are susceptible to degradation due to light and various oxidation agents.

If special physical properties of the polyurethane flexible foams are required instead of polyether polyols, polyester polyols may be used in their preparation. The resultant foams, however, have a very low resistance to hydrolysis.

In order to reduce these drawbacks, it is suggested in German Published Application No. 28 15 540 that certain starting components be selected for the preparation of polyurethane flexible foams. These include a urethane group-containing mixture of diphenylmethane diisocyanates and polyphenyene-polymethylene-polyisocyanates containing 55 to 85 percent by weight of diphenylmethane-diisocyanate isomers as the polyisocyanates, polyester polyols or mixtures of polyester polyols and polyether polyols containing at least 60 percent by weight of polyester polyol as the polyhydroxyl compounds, and as the blowing agent, water or mixtures of water and low boiling, halogen-containing hydrocarbons. Particular mention is made of polyester polyols having a molecular weight of 750 to 5000 and a functionality of 2 to 3.5 which are produced by the polycondensation of a dicarboxylic acid mixture of succinic, glutaric and adipic acid in certain quantity ratios and 2- and 3-functionality alcohols. In this manner polyurethane flexible foams can be produced which have high load bearing and energy absorption capacities as well as resistance to hydrolysis.

Polyurethane flexible foam parts having unusual shapes may best be produced by cutting the parts from foils and panels using specially developed equipment, i.e., die cutters.

It is known that it is very difficult to cut low density polyurethane flexible foams based on polyester polyol. The cutting surfaces adhere to each other at certain points or totally so that a flawless structural manufacture of complicated parts is almost impossible. The addition of small quantities of paraffin oil in order to improve the cutability is impractical since paraffin oil and polyester polyols are not miscible and therefore flaws result in the formation of the foam.

It is therefore the purpose of this invention to produce polyurethane flexible foams from starting components which were liquid at the processing temperature and which have improved physical properties, good cutting properties and high resistance to hydrolysis.

Surprisingly, this task could be met by using specific polyester polyols based on dicarboxylic acids and mixtures of diols and triols in certain quantity ratios for the preparation of the polyurethane flexible foams.

DESCRIPTION OF THE PREFERRED EMBODIMENTS

In accordance with the present invention the flexible polyurethane foams are prepared by reacting organic polyisocyanates, polyhydroxyl compounds and optionally chain extenders in the presence of catalysts and blowing agents as well as auxiliaries and additives. Liquid polyester polyols having hydroxyl numbers of 40 to 80 and molecular weights of 1500 to 5000 are used as the polyhydroxyl compounds. They are produced by the polycondensation of organic dicarboxylic acids with polyol mixture A which, based on the total weight of polyol consists of:

5 to 50 percent by weight of 1,4-butanediol,
20 to 60 percent by weight of 1,5-pentanediol,
8 to 35 percent by weight of 1,6-hexanediol,
2 to 15 percent by weight of triol, and
0 to 65 percent by weight of diethylene glycol or polyol mixture B which, based on the total weight of polyol consists of:

10 to 50 percent by weight of 1,4-butanediol,
15 to 45 percent by weight of 1,6-hexanediol,
15 to 65 percent by weight of diethylene glycol, and
2 to 15 percent by weight of triol.

The process according to this invention has the advantage that the polyester polyols are liquid at the processing temperature, that is, at temperatures between 20° and 25° C. The flexible polyurethane foams produced from the polyester polyols to be used in accordance with this invention have good physical properties, particularly excellent die cutability and at the same time have a very good resistance to hydrolysis.

For the preparation of flexible polyurethane foams according to the process of this invention, polyester polyols with hydroxyl numbers of 40 to 80, preferably 45 to 70, and molecular weights of 1500 to 5000, preferably 1700 to 4000, are used as the polyhydroxyl compounds. The average functionality of the polyester polyols is a maximum of 3.5, but preferably ranges from 2.2 to 3.0. The acid numbers normally are less than 3, preferably between 0.5 and 2 mgs KOH/gram of sample.

Suitable polyester polyols are produced, for example, by reacting organic dicarboxylic acids containing 2 to 12 carbon atoms, preferably, aliphatic dicarboxylic acids with 4 to 6 carbon atoms with polyol mixtures A or B to be used in accordance with this invention. The polyester polyols obtained in this manner may be used individually or in mixtures.

Possible dicarboxylic acids include: aliphatic or olefinically unsaturated dicarboxylic acids such as succinic, glutaric, adipic, sebaric, azelaic, sebasic, decanedicarboxylic, maleic and fumaric acids, as well as aromatic dicarboxylic acids such as phthalic acid, isophthalic acid, and terephthalic acid. The organic dicarboxylic acids may be used individually as well as in mixtures with each other. Mixtures of 20 to 35 percent by weight of succinic acid, 35 to 50 percent by weight of glutaric acid, and 20 to 32 percent by weight of adipic acid based on the total weight of the dicarboxylic acids, for example, have proven to work well. Adipic acid, however, is used on a preferred basis. Instead of the free dicarboxylic acids the corresponding dicarboxylic acid derivatives such as dicarboxylic acid esters of alcohols having 1 to 4 carbon atoms or dicarboxylic anhydrides may also be used.

Polyols contemplated for use in this invention are those consisting of the following substances based on the overall weight of the polyol mixture:

Polyol Mixture A 5 to 50 percent by weight, preferably 9 to 40 percent by weight, of 1,4-butanediol,
20 to 60 percent by weight, preferably 22 to 55 percent by weight, of 1,5-pentanediol,
8 to 35 percent by weight, preferably 12 to 30 percent by weight, of 1,6-hexanediol,
2 to 15 percent by weight, preferably 2 to 10 percent by weight, of one or more triols, and
0 to 65 percent by weight, preferably 0 to 50 percent by weight, of diethylene glycol
and Polyol Mixture B 10 to 50 percent by weight, preferably 17 to 45 percent by weight, of 1,4-butanediol,
15 to 45 percent by weight, preferably 24 to 40 percent by weight, of 1,6-hexanediol,
15 to 65 percent by weight, preferably 20 to 50 percent by weight, of diethylene glycol, and
2 to 15 percent by weight, preferably 2 to 10 percent by weight, of one or more triols.

Glycerine and trimethylolpropane have proven to work particularly well as the triols so that these substances, individually or as mixtures, are used on a preferred basis.

Mixtures of butane-, pentane- and hexanediol can be produced, by the catalytic hydrogenation of the above-mentioned mixture of succinic, glutaric, and adipic acid according to the data contained in German Published Application No. 23 21 101. The diol mixture is subsequently purified according to commonly used methods.

The polyether polyols used in accordance with this invention are produced according to basically known methods by the polycondensation of preferably one dicarboxylic acid or a dicarboxylic acid mixture with polyol mixture A or B at temperatures of 100° to 250° C., preferably 130° to 220° C., in the presence of commonly used esterification catalysts such as organic compounds of titanium, vanadium or tin. Benzene, toluene, xylene, chlorobenzene may be employed advantageously for the azeotropic distillation of the water of reaction, preferably under reduced pressure, in the end phase of the esterification.

Under certain circumstances, it may be advantageous to also use additional chain extenders for the preparation of the polyurethane flexible foams in addition to the polyester polyols to be used in accordance with this invention. Suitable chain extenders include particularly difunctional compounds having molecular weights of 18 to less than 450, preferably 6 to 300. Preferably used are aliphatic diols having 2 to 6 carbon atoms such as ethylene glycol, 1,4-butanediol, and 1,6-hexanediol and aromatic-aliphatic diols such as di-($\beta$-hydroxyethyl)-hydroquinone. The molar ratio of polyester polyol to chain extender is a function of the desired physical properties of the polyurethane flexible foam and may be varied within wide limits.

Aromatic polyisocyanates are preferred for the preparation of polyurethane flexible foams according to the process of this invention. Included are mixtures of 2,4'- and 4,4'-diphenylmethane-diisocyanate, mixtures of diphenylmethane-diisocyanates, and polyphenylene polymethylene polyisocyanates containing 55 to 85 percent by weight and preferably 60 to 80 percent by weight of diphenylmethane-diisocyanate isomers based on the overall mixture, 2,4- and 2,6-toluene diisocyanate and the corresponding commercially available isomer mixtures and mixtures of toluene diisocyanates and mixtures of diphenylmethane-diisocyanates and polyphenylenepolymethylene polyisocyanates with diphenylmethane diisocyanate contents of 30 to 80 percent by weight, preferably 40 to 60 percent by weight based on the overall weight of the mixture.

Frequently so-called modified multifunctional isocyanates may be used, that is, products which are obtained by the chemical reaction of the above polyisocyanates. Possible modified organic polyisocyanates include, for example: polyisocyanates containing carbodiimide groups according to German Pat. No. 10 92 007; polyisocyanates containing allophonate groups such as described in British Pat. No. 994 890, the published documentation of Belgium Pat. No. 761 626 and published Dutch publication No. 71 02 524; all polyisocyanates containing isocyanurate groups as described in German. Pat. Nos. 10 22 789, 12 22 067 and 10 27 394 as well as German published applications Nos. 19 29 034 and 20 04 048; polyisocyanates containing urethane groups as described in the published documentation of Belgium Pat. No. 752 261 or U.S. Pat. No. 3,394,164; polyisocyanates containing acylated urea groups according to German Pat. No. 12 30 778; polyisocyanates containing biuret groups according to German Pat. No. 11 01 394 and British Pat. No. 889 050; polyisocyanates produced by telomerization reactions for instance corresponding with the published documentation for Belgium Pat. No. 723 640; and polyisocyanates containing ester groups as taught to in British Pat. Nos. 965 474 and 10 72 956, U.S. Pat. No. 3,567,765 and German Pat. No. 12 31 688.

Preferably used, however, are: polyisocyanate terminated prepolymers prepared by reacting low molecular diols, triols or polypropylene glycols with modified 2,4'- and 4,4'-diphenyl methane-diisocyanate mixtures or toluene diisocyanate, carbodiimide group and/or isocyanurate ring containing polyisocyanates for instance based on diphenylmethane diisocyanate and/or toluene diisocyanate and particularly 2,4- and 2,6-toluene diisocyanate as well as the corresponding commercially available isomer mixtures for instance in a weight ratio of 80:20 and mixtures of toluene diisocyanates and crude MDI.

The blowing agents used in the process according to this invention include water, which reacts with the isocyanate groups to form carbon dioxide. The water concentrations which are used advantageously are 0.01 to 5 percent by weight, preferably 0.1 to 2 percent by weight based on the polyester polyol weight.

Other blowing agents which may be used are low boiling liquids which evaporate under the influence of the exothermal polyaddition reaction. Suitable for this purpose are liquids which are inert with respect to the organic polyisocyanates and which have boiling points not in excess of 100° C. under atmospheric pressure, preferably between −40° and +50° C. Examples of such preferably used liquids are halogenated hydrocarbons, such as methylene chloride, trichlorofluoromethane, dichlorodifluoromethane, dichloromonofluoromethane, dichlorotetrafluoroethane and 1,1,2-trichloro-1,2,2-trifluoroethane. Mixtures of these low boiling liquids with each other and/or with other substituted or non-substituted hydrocarbons may also be used.

The most advantageous amount of blowing agents other than water for the preparation of the polyurethane flexible foams is a function of the density which is to be achieved. Generally, quantities of 0.5 to 30 percent by weight, preferably 5 to 20 percent by weight, based on the weight of the polyester polyol will bring about satisfactory results.

Additionally, catalysts which accelerate the polyurethane formation and optionally auxiliaries and additives as they are commonly used for the preparation of polyurethane flexible foams may be incorporated in the foamable reaction mixture. Included among these are surface active agents, flame retardants, pore regulators, antioxidants, hydrolysis protection agents, dyes, fillers and other additives.

Suitable catalysts for accelerating the reaction between the polyester polyols, chain extenders, water and the organic polyisocyanates include, for example, tertiary amines such as dimethylbenzylamine, N,N,N',N'-tetramethyldiamino-ethyl-ether, bis-(dimethylaminopropyl)-urea, N-methyl- or N-ethylmorpholine, dimethylpiperazine, 1,2-dimethylimidazole, 1-aza-bicyclo-(3,3,0)-octane and preferably triethylenediamine; metal salts such as tin octoate, lead octoate, tin diethylhexoate and preferably tin (II) salts and dibutyltin dilaurate as well as mixtures of tertiary amines and organic tin salts. Preferably used are 0.5 to 5 percent by weight of tertiary amines and/or 0.05 to 2.5 percent by weight of metals salts based on the polyester polyol weight.

Surface active agents which promote homogeneity of the starting materials and which are also suitable to regulate the cell structure of the polyurethane flexible foams may be employed. Examples of these include siloxane-oxalkylene mixed polymerizates and other organo polysiloxanes, ethyloxated, alkylphenyls, ethyloxated fatty alcohols, paraffin oils, castor oil and/or ricinoleic acid esters and Turkish Red Oil which are used in quantities of 0.2 to 6 parts by weight per 100 parts by weight of polyester polyol.

In order to improve the flame resistance, flame retardants may be incorporated in the flexible polyurethane foams produced according to this invention. Examples include compounds containing phosphorus and/or halogen atoms such as tricresylphosphate, tris-2-choroethylphosphate, tris-chloropropylphosphate and tris-2,3-dibromopropylphosphate, inorganic flame retardants such as antimony trioxide, arsenic oxide, ammonium phosphate, ammonium sulfate, and others, as well as derivatives of cyanic acid such as cyanamide, cyandiamide, guanidine, guanidine salts, biguanide and melamine. Generally it has proven to be advantageous to use 5 to 50 parts by weight of these flame retardants per 100 parts by weight of the respective polyester polyols.

More detailed data on the above-mentioned commonly used auxiliaries and additives are contained in the appropriate literature, for example, in the monograph by J. H. Saunders and K. C. Frisch, "High Polymers," vol. XVI, Polyurethanes, Parts 1 and 2, Interscience Publishers 1962 or 1964.

For the manufacture of the flexible polyurethane foams, the organic polyisocyanates and polyester polyols or mixtures of polyester polyols and chain extenders are reacted in such quantities that the ratio of NCO to OH groups is 1:0.8 to 1:1.2, preferably approximately 1:0.9 to 1:1.1.

The flexible polyurethane foams are produced either by the prepolymer or the one-shot process. When using a mixing head with several feed nozzles, the starting components may be introduced individually and are well mixed in the mixing head. It has proven to be particularly advantageous to employ a two-component system and to combine the mixture of polyester-polyols, catalysts, blowing agents, auxiliaries and additives as Component A and to use the organic polyisocyanates as Component B. An advantage of this method is that Components A and B can be stored separately and can be transported in a space saving manner.

For the preparation of the flexible polyurethane foams, the described starting materials in the quantity ratios cited are well mixed at temperatures of 15° to 60° C., preferably 20° to 35° C., and the reaction mixture is then allowed to foam in open and/or closed cold or heated molds.

The resultant polyurethane flexible foams have densities of approximately 15 to 70 grams/liter. The products have improved resistance to hydrolysis and very good die cutability with cut parts having thicknesses of 0.5 cm and 10 cm length which do not show any adhesions at the edges.

The flexible polyurethane foams based on polyester polyols and produced in accordance with this invention are used in a multiplicity of areas, for example, in the construction sector, for adhesives, jointing and sealing bands, as insulation material for heat storage devices and heating pipes, as filter material in air conditioning equipment, as insulating material for sound absorption, in the automobile industy as insulating materials for jointing and intermediate layers, in the sound reproduction and electrical industry in the form of cut parts, as dust filters in respirators, as packaging material for breakable goods, for the manfacture of elastic bandaging material, and in the household sector in the form of sponges and sponge cloths.

The following Examples are intended to illustrate the invention.

All parts referred to in the examples are parts by weight.

EXAMPLE 1

A mixture of 73.1 parts by weight of adipic acid, 54.8 parts by weight of a diol mixture consisting of 21 percent by weight of 1,4-butanediol, 52 percent by weight of 1,5-pentanediol, and 27 percent by weight of 1,6-hexanediol and 2.95 parts by weight of trimethylolpropane was esterified under normal pressure by azeotroping off the water of reaction at temperatures up to 210° C. Following this, the esterification was completed by reducing the reaction pressure to approximately 40 mbar. After stripping off 18.7 parts by weight of volatiles, a polyester polyol was obtained which was liquid at room temperature and which had the following properties:

| | |
|---|---|
| OH number: | 49.7 mg KOH/gram |
| Acid number: | 1 mg KOH/gram |
| Viscosity (75° C.): | 1800 mPas |
| Iodine color number: | 2 |

The resultant polyol mixture contained 20 percent by weight of 1,4-butanediol; 49.4 percent by weight of 1,5-pentanediol; 25.6 percent by weight of 1,6-hexanediol; and 5.1 percent by weight of trimethylolpropane.

EXAMPLE 2

A mixture of 78 parts by weight of adipic acid, 58 parts by weight of a diol mixture of 22 percent by weight of 1,4-butanediol, 50 percent by weight of 1,5-pentanediol, and 28 percent by weight of 1,6-hexanediol and 4,4 parts by weight of trimethylolpropane were esterified employing the procedure of Example 1. After stripping off 19.3 parts by weight of volatiles, a polyester polyol was obtained which was liquid at room temperature and had the following properties:

| | |
|---|---|
| OH number: | 63 mg KOH/gram |
| Acid number: | 0.7 mg KOH/gram |
| Viscosity (75° C.): | 1060 mPas |
| (25° C.): | 13040 mPas |
| Iodine color number: | 1-2 |

The resultant polyol mixture contained 20.5 percent by weight of 1,4-butanediol; 46.5 percent by weight of 1,5-pentanediol; 26 percent by weight of 1,6-hexanediol and 7.1 percent by weight of trimethylolpropane.

EXAMPLE 3

Employing the procedure of Example 1, a mixture of 64.5 parts by weight of adipic acid, 24 parts by weight of a diol mixture consisting of 22 percent by weight of 1,4-butanediol, 50 percent by weight of 1,5-pentanediol and 28 percent by weight of 1,6-hexanediol, 24.5 parts by weight of diethylene glycol and 3.6 parts by weight of trimethylolpropane was esterified. After stripping off 16 parts by weight of volatiles, a polyester polyol was obtained which was liquid at room temperature and had the following properties:

| | |
|---|---|
| OH number: | 61 mg KOH/gram |
| Acid number: | 0.7 mg KOH/gram |
| Viscosity (75° C.): | 1120 mPas |
| (25° C.): | 15800 mPas |
| Iodine Color number: | 1-2 |

The resultant polyol mixture contained 10.2 percent by weight of 1,4-butanediol, 23 percent by weight of 1,5-pentanediol, 12.9 percent by weight of 1,6-hexanediol, 47.0 percent by weight of diethylene glycol, and 6.9 percent by weight of trimethylolpropane.

EXAMPLE 4

A mixture of 2,619 parts by weight of adipic acid, 1,963 parts by weight of a diol mixture consisting of 22 percent by weight of 1,4-butanediol, 50 percent by weight of 1,5-pentanediol, and 28 percent by weight of 1,6-hexanediol and 103 parts by weight of glycerine was esterified employing the procedure of Example 1. After stripping off 680 parts by weight of volatiles, a polyester polyol which was liquid at room temperature was obtained and which had the following properties:

| | |
|---|---|
| OH number: | 59 mg KOH/gram |
| Acid number: | 1.1 mg KOH/gram |
| Viscosity (75° C.): | 1450 mPas |
| (25° C.): | 18400 mPas |
| Iodine color number: | 1 |

The resultant polyol mixture contained 20.9 percent by weight of 1,4-butanediol, 47.5 percent by weight of 1,5-pentanediol, 26.6 percent by weight of 1,6-hexanediol and 5 percent by weight of glycerine.

EXAMPLE 5

A mixture of 64.5 parts by weight of adipic acid, 10.2 parts by weight of 1,4-butanediol, 13,4 parts by weight of 1,6-hexanediol, 25.8 parts by weight of diethylene glycol, and 3.6 parts by weight of trimethylolpropane was esterified in employing the procedure of Example 1. After stripping off 16.3 parts by weight of volatiles, a polyester polyol was obtained which was liquid at room temperature and had the following properties:

| | |
|---|---|
| OH number: | 62.6 mg KOH/gram |
| Acid number: | 0.8 mg KOH/gram |
| Viscosity (75° C.): | 1098 mPas |
| (25° C.): | 15400 mPas |
| Iodine color number: | 1-2 |

The resultant polyol mixture contained 19.9 percent by weight of 1,4-butanediol, 26.1 percent by weight of 1,6-hexanediol, 47.1 percent by weight of diethylene glycol and 7.0 percent by weight of trimethylolpropane.

EXAMPLES 6 THROUGH 8

AND

COMPARISON EXAMPLE

Flexible foams having a bulk density of approximately 30 grams per liter were prepared employing:
100 parts by weight of polyester polyol,
3.4 parts by weight of water,
1.2 parts by weight of N,N-dimethylbenzylamine, 1.2 parts by weight of foam stabilizer based on polyether polysiloxane (Niax L 532 ® by Union Carbide Corp.),
and
40 parts by weight of a mixture of 2,4- and 2,6-toluenediisocyanate in a weight ratio of 80:20, by intensively mixing at room temperature and allowing the mixture to foam in an open mold. The polyester polyols used were those prepared in Examples 2, 4, and 5 and were employed in Examples 6, 7, and 8, respectively. The polyester employed in the Comparison Example was an adduct of adipic acid, diethylene glycol and trimethylolpropane having a hydroxyl number of 60.

The physical properties of the resultant flexible foams are summarized in the following table.

The reduction in the compression strength according to DIN 53 578, determined after aging under humid conditions for a period of 120 hours at 85° C. and a relative humidity of 100 percent shows that the hydrolysis resistance of the flexible foams was significantly improved by using the specific polyester polyols. Furthermore, flawlessly shaped parts without any adhesions were obtained by die cutting.

TABLE

| Physical Properties | | Comparison example | Examples | | |
|---|---|---|---|---|---|
| | | | 6 | 7 | 8 |
| Density according to DIN 53 420 | (kg/m$^3$) | 30 | 31 | 32 | 29 |
| Tensile strength according to DIN 53 571 | (kPa) | 165 | 164 | 169 | 150 |
| Breaking elongation according to DIN 53 571 | (%) | 198 | 172 | 188 | 195 |
| Compression strength according to DIN 53 577 at 40 percent compression | (kPa) | 4.9 | 4.7 | 4.8 | 4.3 |
| Reduction of compression strength according to DIN 53 578 after humidity aging (120 hours, 85° C. 100 percent relative humidity) | (%) | 39 | 9.3 | 10 | 14 |
| Cuttability | | Poor Partial Adhesion | Flawlessly cut parts No adhesions | | |

The embodiments of the invention in which an exclusive privilege or property is claimed are defined as follows:

1. A process for the preparation of flexible polyurethane foams by reacting organic polyisocyanates, polyhydroxyl compounds in the presence of catalysts and blowing agents as well as optionally chain extenders, auxiliaries, and additives wherein liquid polyester polyols having hydroxyl numbers of 40 to 80 and molecular weights of 1500 to 5000 are used as polyhydroxyl compounds said polyols produced by the polycondensation of organic dicarboxylic acids with polyol mixture A, based on the total weight of polyol consisting of:

5 to 50 percent by weight of 1,4 butanediol
   20 to 60 percent by weight of 1,5 pentanediol
   8 to 35 percent by weight of 1,6-hexanediol
   2 to 15 percent by weight of triol, and
   0 to 65 percent by weight of diethylene glycol or polyol mixture B, based on the total weight of polyol consisting of:

10 to 50 percent by weight of 1,4 butanediol
   15 to 45 percent by weight of 1,6 hexanediol
   15 to 65 percent by weight of diethylene glycol, and
   2 to 25 percent by weight of triol, based on the total weight.

2. The process of claim 1 wherein trimethylolpropane and/or glycerine are used as the triols.

3. The process of claim 1 wherein adipic acid is used as the organic dicarboxylic acid.

4. The product of claim 1.

* * * * *